US012413444B2

(12) United States Patent
Yang et al.

(10) Patent No.: US 12,413,444 B2
(45) Date of Patent: Sep. 9, 2025

(54) SWITCHABLE TERMINATIONS BASED ON DEVICE IDENTIFIER ON CAN BUS

(71) Applicant: GM Cruise Holdings LLC, San Francisco, CA (US)

(72) Inventors: Yingchang Yang, Palo Alto, CA (US); Jaimin Patel, San Francisco, CA (US); Jason Seitz, Oakland, CA (US); Isaac Brown, San Francisco, CA (US); Thomas Shelburne, South Lyon, MI (US); Devin Cass, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 0 days.

(21) Appl. No.: 18/464,052

(22) Filed: Sep. 8, 2023

(65) Prior Publication Data

US 2025/0088385 A1    Mar. 13, 2025

(51) Int. Cl.
*H04L 12/40* (2006.01)
*B60Q 1/50* (2006.01)
*B60R 16/023* (2006.01)

(52) U.S. Cl.
CPC ............. *H04L 12/40* (2013.01); *B60Q 1/507* (2022.05); *B60R 16/023* (2013.01); *H04L 2012/40215* (2013.01)

(58) Field of Classification Search
CPC .......... H04L 12/40; H04L 2012/40215; B60Q 1/507; B60R 16/023
USPC .......................................................... 307/9.1
See application file for complete search history.

(56) References Cited

U.S. PATENT DOCUMENTS

| | | | | |
|---|---|---|---|---|
| 6,904,348 | B2* | 6/2005 | Drummond | B60R 1/088 359/604 |
| 8,866,441 | B2* | 10/2014 | Weng | H01M 10/441 307/66 |
| 9,718,420 | B1* | 8/2017 | Sun | B60L 3/0069 |
| 10,369,896 | B2* | 8/2019 | Namuduri | B60L 50/66 |
| 10,432,130 | B2* | 10/2019 | Namuduri | H02M 7/5387 |
| 2014/0118222 | A1* | 5/2014 | Barrett | G01C 21/3688 345/2.2 |
| 2021/0120017 | A1* | 4/2021 | Antonsson | G01R 27/16 |
| 2022/0286318 | A1* | 9/2022 | Shirato | H04L 12/40 |
| 2023/0239173 | A1* | 7/2023 | Gallagher | H04L 12/40 370/235 |

* cited by examiner

*Primary Examiner* — Alfonso Perez Borroto
(74) *Attorney, Agent, or Firm* — CANTOR COLBURN LLP (57) ABSTRACT

A set of devices are coupled to a control area network (CAN) bus. At least some of the devices include switchable resistors that can apply a termination resistor to the CAN bus. Identification pins are used to identify devices on the CAN bus, and also to identify which device or devices are at the ends of the CAN bus. If a device is at an end of the CAN bus, the switch of the switchable resistor is set to couple the termination resistor to the CAN bus. Otherwise, the termination resistor is not coupled to the CAN bus.

9 Claims, 8 Drawing Sheets

SWITCHABLE TERMINATIONS BASED ON DEVICE IDENTIFIER ON CAN BUS

TECHNICAL FIELD OF THE DISCLOSURE

The present disclosure relates generally to configurations for termination resistors on control area networks.

BACKGROUND

Modern vehicles include a variety of connected devices and systems enabling various functions, such as driving, communications, safety features, comfort features, user interfaces, etc. For example, autonomous vehicles (AVs) often include multiple sensor systems (e.g., cameras, radar, and lidar), computers running various software processes (e.g., image detection, routing, path planning), components for controlling AV movement (e.g., engine control, brake control, steering control), and user interface components (e.g., display screens, microphones, speakers, etc.). Various hardware and software components communicate over internal networks on vehicles, e.g., to exchange data and transmit instructions.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

Control area networks (CANs) provide one option for devices to communicate with each other without a host computer. The CAN bus standard was designed for vehicular applications. CAN is a widely used communication protocol in the automotive industry. CAN buses are also used in other applications, such as aviation equipment, ships, building control systems, agricultural equipment, medical instruments, etc.

A CAN bus is a multi-master serial bus for connecting devices, which are also referred to as nodes. CAN nodes may be identical (e.g., multiple instances of the same device) or different (e.g., two or more different devices), coupled to the CAN bus. Nodes on the CAN bus communicate with each other using a CAN protocol.

The CAN bus is physically implemented as a two-wire bus with a 120Ω characteristic impedance. In a high-speed CAN bus following the ISO 11898-2 standard, nodes are arranged along a linear bus, and each end of the bus is terminated with a 120Ω resistor. Often, the two end nodes are specifically designed to provide the needed resistance. The 120Ω resistors provide signal integrity for signals transmitted along the bus. Without the termination resistors, the CAN signals traveling on the bus may have unwanted voltage perturbations such as high rings, undershoots, overshoots, etc. However, if other nodes on the CAN bus (e.g., not only the two end nodes) have 120Ω termination resistors, this additional resistance may reduce the CAN signal amplitude. Thus, the other nodes are unterminated.

In prior CAN systems, the 120Ω resistors have been included in the end nodes either by designing the end nodes differently from the other nodes (e.g., including the 120Ω resistors in the end nodes, and not in other nodes), or by connecting external 120Ω resistors to the two end nodes via a wiring harness. Separately designing and manufacturing the end nodes to include the 120Ω resistors can be expensive and complicated. For example, if a CAN bus includes multiple instances of the same type of device, one of which is the end node, the end node with the resistor has to be manufactured according to a variant design. During assembly, care must be taken to place the correct hardware at the ends of the CAN bus. On the other hand, if the resistors are separately added via an external harness, then each device (or at least the end devices) requires additional pins to provide the connection to the resistor, and the wiring harness build and overall system build is more complicated.

As described herein, devices designed for communication over a CAN bus include a switchable resistor that can provide a termination resistor if a given device is at the end of the CAN bus. In many systems with two or more identical modules, each module is assigned an unique identification (ID) to help distinguish it from the rest. Similarly, the nodes or modules on the CAN bus, if identical, each has a unique ID. As described herein, the ID pins can also be used to identify the end nodes and properly configure the switches in the devices. For example, a device includes an interpreter circuit coupled to the ID pins. The interpreter circuit is programmed (e.g., by firmware, software, or hard wiring) to configure the switchable resistor based on the ID pin. For example, the interpreter circuit is programmed to close a switch to couple the resistor to the CAN bus if an ID pin is a specific value; otherwise, the switch is opened, and the resistor is not connected to the CAN bus.

Including the switch, 120Ω resistor, and interpreter circuit in each device is relatively inexpensive. Furthermore, the same device design that includes a switchable resistor can be used for both middle nodes and end nodes, allowing all devices of a given device type on the CAN network to have an identical design and manufacturing process. Lastly, since the ID pins are already included for CAN devices, compared to the external resistor design described above, the switchable resistor devices reduce the number of pins on the connector and do not require additional hardware and wiring in the harness.

As will be appreciated by one skilled in the art, aspects of the present disclosure, in particular aspects of CAN buses having devices with switchable termination resistors, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of certain specific embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

Example AV System

Figure 1:
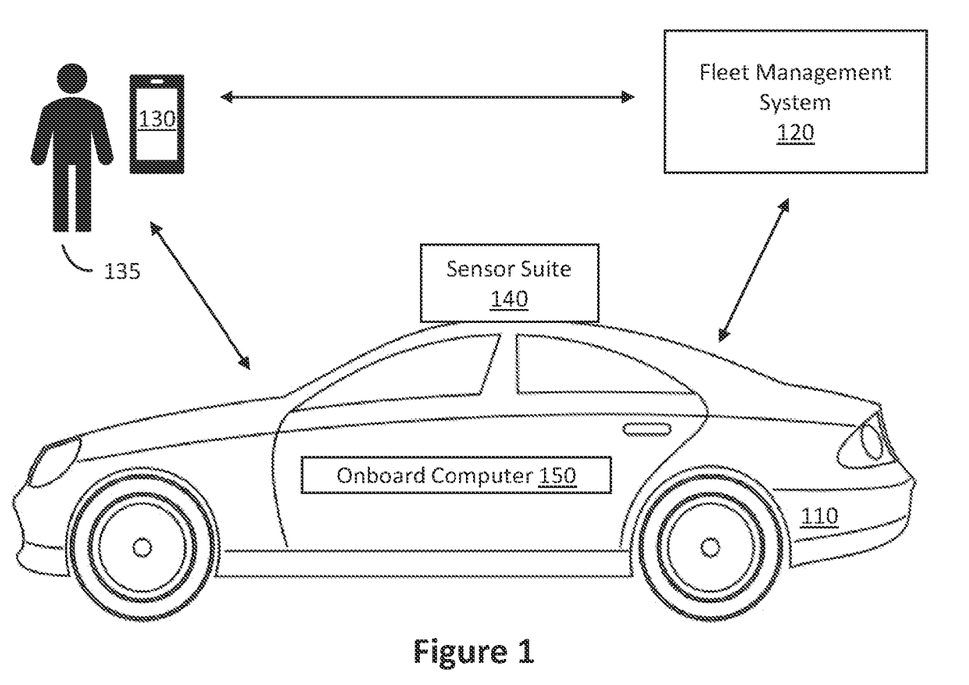
FIG. 1 is a block diagram illustrating a system including an example AV that may include a CAN bus with devices having switchable terminations based on their device identifiers, according to some embodiments of the present disclosure.

FIG. 1 is a block diagram illustrating a system 100 including an example AV that may include a CAN bus with devices having switchable terminations based on their device identifiers, according to some embodiments of the present disclosure. The system 100 may include an autonomous vehicle (AV) 110, a fleet management system 120, and a user device 130. The AV 110 may be part of a fleet of AVs, which may be similar to the AV 110. A fleet of AVs is referred to collectively as AVs 110. AV 110 may include a sensor suite 140 and an onboard computer 150.

The AV 110 may be a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV 110 (or any other movement-retarding mechanism); and a steering interface that controls steering of the AV 110 (e.g., by changing the angle of wheels of the AV 110). The AV 110 may additionally or alternatively include interfaces for control of any other vehicle functions, e.g., windshield wipers, headlights, turn indicators, air conditioning, etc.

The AV 110 includes a sensor suite 140, which includes a computer vision ("CV") system, localization sensors, and driving sensors. For example, the sensor suite 140 may include photodetectors, cameras, radar (radio detection and ranging), sonar (sound detection and ranging), lidar (light detection and ranging), GPS (global positioning system) sensors, wheel speed sensors, inertial measurement units (IMUs), accelerometers, microphones, strain gauges, pressure monitors, barometers, thermometers, altimeters, etc. The sensors may be located in various positions in and around the AV 110.

An onboard computer 150 is connected to the sensor suite 140 and functions to control the AV 110 and to process sensed data from the sensor suite 140 and/or other sensors to determine the state of the AV 110. Based upon the vehicle state and programmed instructions, the onboard computer 150 modifies or controls behavior of the AV 110. For example, the onboard computer 150 maneuvers the AV 110 according to routing selections determined by an onboard or remote navigation system.

The onboard computer 150 is preferably a general-purpose computer adapted for I/O communication with vehicle control systems and sensor suite 140, but may additionally or alternatively be any suitable computing device, or a group of computing devices. The onboard computer 150 may transmit data to and receive data from other AV components via one or more local networks on the AV. The onboard computer 150 is preferably connected to the Internet via a wireless connection (e.g., via a cellular data connection). Additionally or alternatively, the onboard computer 150 may be coupled to any number of wireless or wired communication systems.

The onboard computer 150 interfaces with control devices that can implement commands from the onboard computer 150 to control physical hardware of the AV. Control devices for implementing driving instructions from the onboard computer 150 are often referred to as electronic control units (ECUs). For example, one ECU may be a computer that controls various aspects of an engine's operation. If a vehicle has an internal combustion engine, the ECU may control fuel injection, ignition timing and air-fuel ratio, based on various inputs, such as engine speed and throttle position. In a battery-powered AV, the ECU may control power distribution to the electric motor and power flow to other components, control the motor's speed and torque, control regenerative braking, perform thermal management, and perform other control functionalities. Other ECUs may provide control of other vehicle functions, e.g., steering, airbags, windshield wipers, headlights, turn indicators, air conditioning, user interface devices, etc.

The CAN bus protocol may be used to provide communications between various AV components, e.g., the ECUs and/or other hardware components described above. In some examples, multiple devices connected to a particular CAN bus may be identical, e.g., multiple identical display screens may be coupled to a display controller on one CAN bus; multiple air conditioning fans may be coupled to an air conditioning controller on another CAN bus. As another example, sensor systems may be connected to a CAN bus, e.g., multiple identical cameras in the sensor suite 140 may be coupled to a CAN bus; seatbelt sensors from each seatbelt in the AV 110 may be coupled to another CAN bus. Any of the CAN buses and/or devices on the CAN buses may be configured as described herein, e.g., as described with respect to FIGS. 2-8.

The fleet management system 120 manages the fleet of AVs 110. The fleet management system 120 may manage a service that provides or uses the AVs 110, e.g., a service for providing rides to users with the AVs 110, or a service that delivers items, such as prepared foods, groceries, or packages, using the AVs 110. The fleet management system 120 may select an AV from the fleet of AVs 110 to perform a particular service or other task and instruct the selected AV (e.g., AV 110a) to autonomously drive to a particular location (e.g., a pickup address or a delivery address). The fleet management system 120 may select a route for the AV 110 to follow. The fleet management system 120 also may manage fleet maintenance tasks, such as charging and servicing of the AVs 110.

As shown in FIG. 1, the AV 110 may communicate with the fleet management system 120. The AV 110 and fleet management system 120 may connect over a public network, such as the Internet. More specifically, the fleet management system 120 may receive and transmit data via one or more appropriate devices and network from and to the AV 110, such as by wireless systems, such as a wireless local area network (WLAN) (e.g., an IEEE 802.11 based system), a cellular system (e.g., a wireless system that utilizes one or more features offered by the 3rd Generation Partnership Project (3GPP), including General Packet Radio Service (GPRS)), and the like.

The user device 130 may be a personal device of the user 135, e.g., a smartphone, tablet, computer, or other device for interfacing with a user of the fleet management system 120. The user device 130 may provide one or more applications (e.g., mobile device apps or browser-based apps) with which the user 135 can interface with a service that provides or uses AVs. The service, and the AVs 110 associated with the service, may be managed by the fleet management system 120, which may also provide the application to the user device 130. In other embodiments, the service may be managed by a separate system (e.g., a food delivery service) that relies on the AV fleet for some or all of its transportation tasks and interacts with the fleet management system 120 to arrange transportation tasks.

Example AV With Display Screens on CAN Bus

Figure 2:
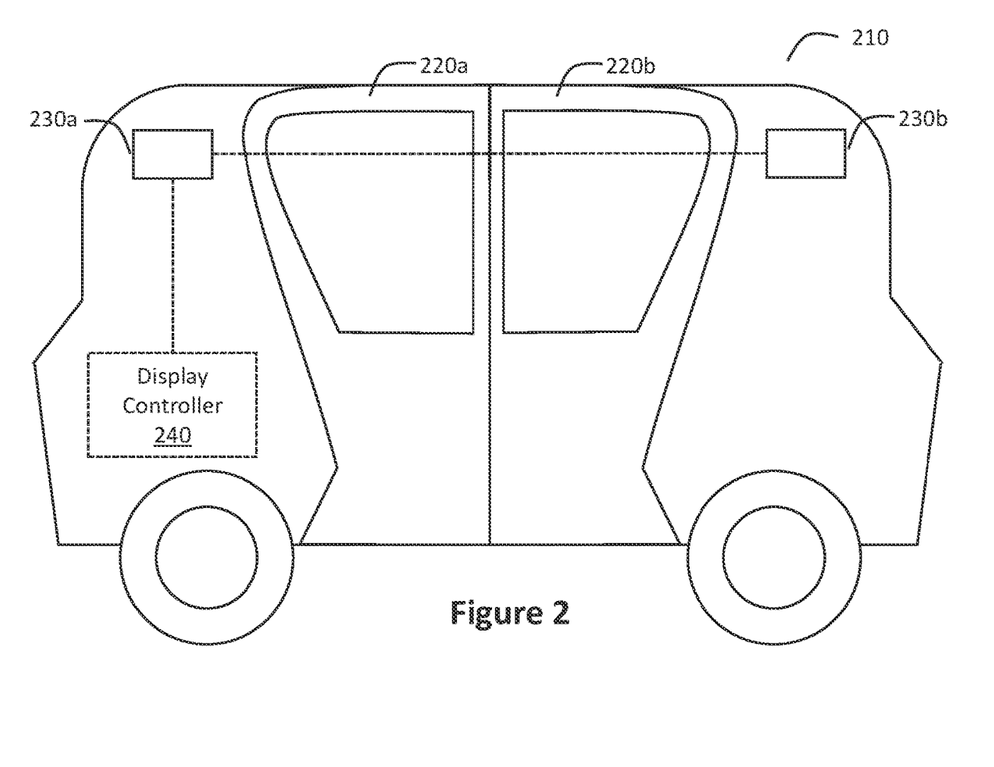
FIG. 2 illustrates an example vehicle with devices that may be arranged on a CAN bus, according to some embodiments of the present disclosure.

FIG. 2 illustrates an example vehicle with devices that may be arranged on a CAN bus, according to some embodiments of the present disclosure. FIG. 2 illustrates an example AV 210, and in particular, illustrates a side view of an example AV 210. The AV 210 may be an example of the AV 110 described above. The AV 210 includes a pair of doors 220a and 220b that can open to enable a user to access an interior of the AV 210, e.g., for a passenger to enter the AV 210, or a delivery recipient to retrieve a delivery item from the AV 210.

The AV 210 further includes display screens 230a and 230b mounted on an exterior of the AV 210. The display screens 230a and 230b are coupled to a display controller 240, which is typically not visible from the exterior of the AV 210 (as indicated by the dashed box around the display controller 240). The display controller 240 provides instructions to the display screens 230, e.g., to instruct the display screens 230a and 230b to output a particular image or video that the user 135 can use to identify the AV 210. For example, the display screens 230a and 230b can be instructed to output an AV name, a user's name, a number, a particular image, etc. The AV 210 may further include two display screens similar to the display screens 230a and 230b on the opposite side of the car. In various embodiments, the AV 210 may include additional or alternative display screens 230 at different positions around the AV 210.

The display screens 230a and 230b may be identical to each other. The display screens 230a and 230b, as well as the display controller 240, may be coupled to a CAN bus, e.g., the CAN bus described with respect to FIG. 3. The display screens 230a and 230b may be separately addressed on the CAN bus, e.g., to instruct the display screens 230a and 230b to output different images, or to instruct only one of the display screens 230a and 230b to display an image. In the arrangement shown in FIG. 2, the display screen 230b is on an end of the CAN bus, while the display screen 230b is not on the end of the CAN bus. Thus, the display screen 230b may have a resistor coupled to the CAN bus, while the display screen 230a does not. The resistors may be switched according to the switching configurations described below.

The display screens 230 provide only one example of a device that can include switchable resistors. Other devices or components of the AV 110 or 210 that communicate over a CAN bus may include the switchable resistors as described herein. Furthermore, while the CAN bus and devices on the CAN bus are primarily described herein as being implemented on vehicles such as an AV, the devices described herein, and in particular, devices having a switchable termination resistor, and a CAN that includes such devices, may be used in non-automotive applications, including non-vehicular applications.

Example CAN Bus

Figure 3:
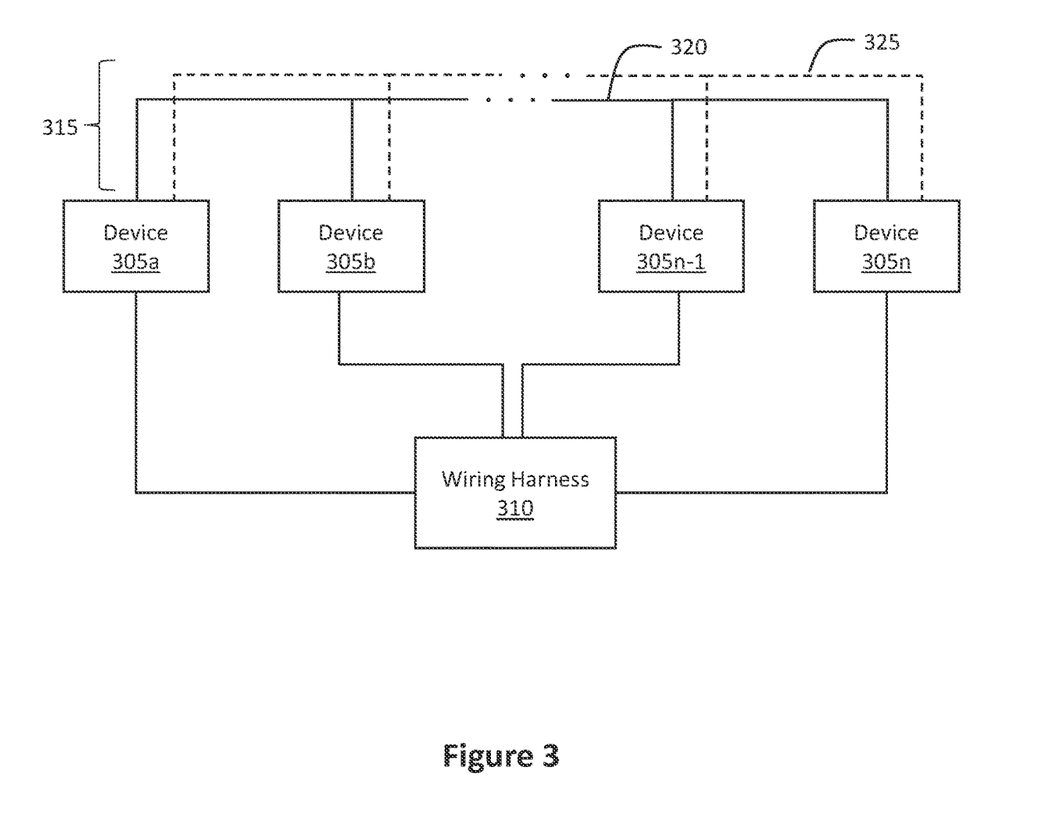
FIG. 3 is a block diagram illustrating devices coupled to a CAN bus and a wiring harness, according to some embodiments of the present disclosure.

FIG. 3 is a block diagram illustrating devices coupled to a CAN bus and a wiring harness, according to some embodiments of the present disclosure. FIG. 3 illustrates a set of devices 305a-305n, referred to collectively as devices 305 or individually as a device 305. Each device 305 is coupled to a wiring harness 310 and to a CAN bus 315. The wiring of the CAN bus 315 may also be physically routed through the wiring harness 310, but the block diagram of FIG. 3 separates the CAN bus 315 from the wiring harness 310 to better illustrate connections between the devices 305 and the CAN bus 315.

The CAN bus 315 includes two lines 320 and 325. The line 320 is drawn as a solid line, and the line 325 is drawn as a dashed line. The line 320 may be a high voltage line and the line 325 a low voltage line. The lines 320 and 325 of the CAN bus 315 are each coupled to the devices 305a-305n. While four devices 305a, 305b, 305n-1, and 305n are illustrated, any number n devices may be coupled to the CAN bus 315. In some embodiments, n may be less than four (i.e., two or three), and in others, n is greater than four.

In this example, the device 305a and the device 305n are the end devices, also referred to as end nodes. The devices 305b and 305n-1 may be referred to as middle devices, middle nodes, non-end devices, or non-end nodes. As described above, the end devices 305a and 305n couple a termination resistor (e.g., a 120Ω resistor, or a set of resistors with a combined resistance of 120Ω) to the ends of the CAN bus 315, and in particular, between the high voltage line 320 and the low voltage line 325.

In the example of FIG. 2, the display controller 240 may correspond to the end node 305a, and the display screen 230b corresponds to the end node 305n. The display screen 230a may be a middle node, e.g., device 305b. Display screens on the opposite side of the AV 210 may be additional middle nodes. Alternatively, if the devices in FIG. 2 are connected differently, the display controller 240 may be a middle node, while the display screens 230a and 230b may correspond to the end nodes 305a and 305n, respectively.

At least some of the devices 305 include a switchable resistor, e.g., the switchable resistors described with respect to FIGS. 4-7. For example, the devices 305a through 305n-1 may each be a display screen 230. The display screens 230 each include identical hardware, including the switchable resistor. One or more of the devices 305 may not include a switchable resistor. Instead, a particular device (e.g., device 305n) may have a non-switchable resistor (e.g., if the device 305n is the display controller 240, and the display controller 240 is positioned at one end of a CAN bus 315). Alternatively, a particular device (e.g., device 305b) may not include a resistor (e.g., if the device 305b is the display controller 240, and the display controller 240 is not positioned at an end of the CAN bus 315).

Example Device with Switchable Resistor

Figure 4:
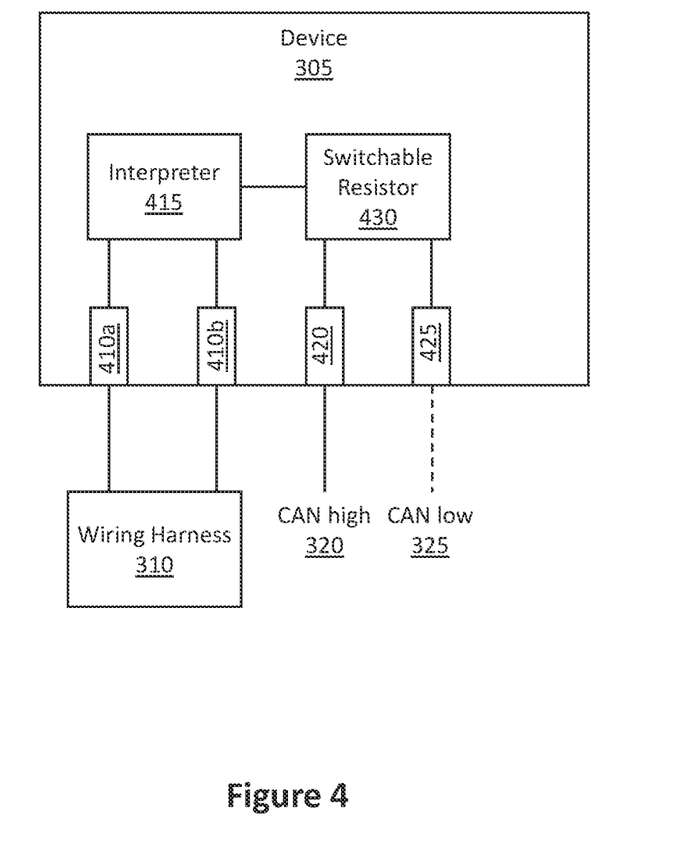
FIG. 4 is a block diagram of a specific device having a switchable resistor coupled to the wiring harness and CAN bus, according to some embodiments of the present disclosure.

FIG. 4 is a block diagram of a specific device having a switchable resistor and coupled to the wiring harness and CAN bus, according to some embodiments of the present disclosure. The device 305 includes an interpreter 415 and a switchable resistor 430. Other components of the device 305 not related to the resistor coupling to the CAN bus 315 are not illustrated, but may include, for example, communications circuitry, processing circuitry (e.g., a central processing unit (CPU), a graphics processing unit (GPU), etc.), sensors, output devices, etc. As described above, the devices 305 may be identical to each other, or, in some cases, one or more of the devices 305 may be different. At least some of the devices 305 of FIG. 3 include the interpreter 415 and the switchable resistor 430 illustrated in FIG. 4.

The device 305 further includes four pins 410a, 410b, 420, and 425. The device 305 may include additional pins not specifically illustrated in FIG. 4. The pins 410a and 410b are ID pins, which provide signals that identify the device 305 on the CAN bus 315. Identifiers provided by the ID pins 410 can be used to separately address each of the devices 305 on the CAN bus 315, e.g., if the CAN bus 315 includes multiple identical devices (e.g., multiple display screens 230). The ID pins 410 are coupled to the wiring harness 310. On the wiring harness 310, a wire coupled to each ID pin 410 is coupled to one of two voltage levels, which may correspond to binary signals (e.g., 0 and 1). For example, if a wire is connected to ground (e.g., applying a 0V voltage to an ID pin 410), this may correspond to a 0, and if a wire is connected to another voltage (e.g., applying a positive voltage Vdd to an ID pin 410), this may correspond to a 1. It should be understood that other voltage levels for indicating different binary signals may be used. In addition, rather than coupling the inputs to the ID pins 410 to the wiring harness 310, as described above, the ID pins 410 can be set in a different way, for example, coupling the ID pins to a dip switch between high (1) or low (0).

In this example, two ID pins 410a and 410b are used, which can provide identifiers for up to four devices 305 on the CAN bus 315. For example, the device 305a has an identifier 00, the device 305b has an identifier 01, the device 305n-1 has an identifier 10, and the device 305n has an identifier 11. In the example of FIG. 2, this may provide addresses for four display screens 230, while the display controller 240 may not have an address provided by the ID pins. If two devices 305 are to be identified on the CAN, a single ID pin 410 may be used. If more than four devices 305 are to be identified on a CAN, additional ID pins may be used (e.g., three ID pins 410 can provide identifiers for up to 8 devices, four ID pins 410 can provide identifiers for up to 16 devices, etc.).

As noted above, the identifiers can be used for communications on the CAN bus 315, e.g., to address a message to a particular one of the devices 305. In addition, the identifier of a given device 305 is received by the interpreter 415, which can instruct the switchable resistor 430 based on the identifier. The interpreter 415 includes a circuit and may be implemented as a comparator, combinational logic circuit, a microcontroller, or a programmable device. In some embodiments, the interpreter 415 is a component of a microcontroller or other processing component of the device 305 that includes additional functionality. The interpreter 415 may be programmed by, e.g., firmware or software, or the interpreter 415 may be hard-wired.

Figure 5:
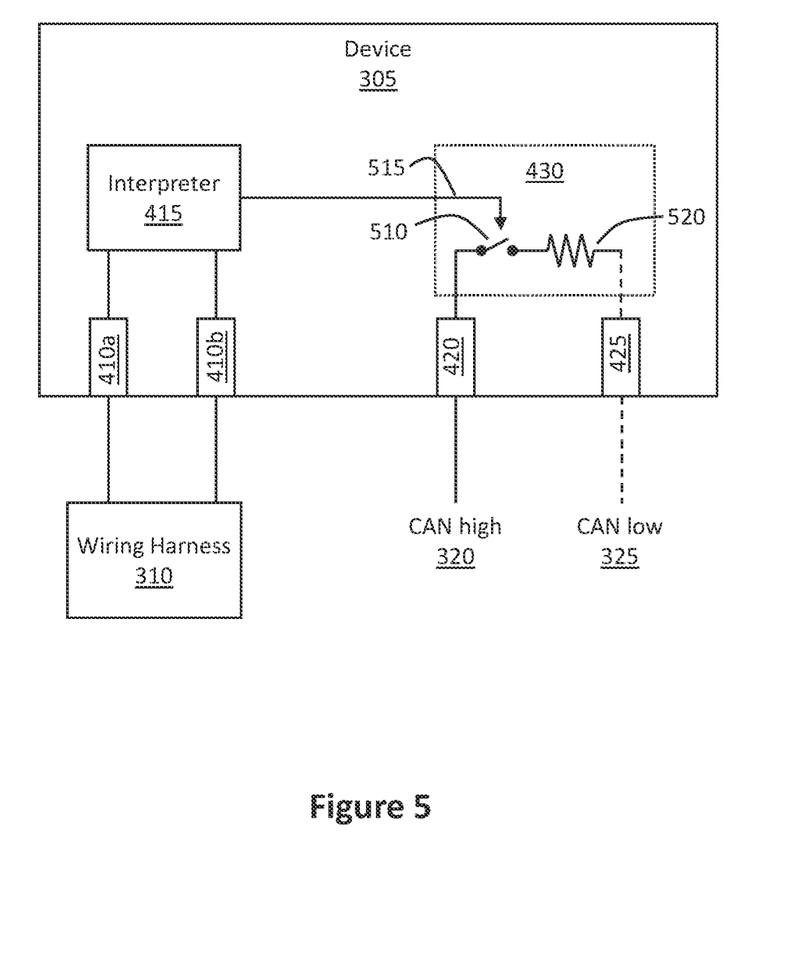
FIG. 5 is a block diagram of a device on a CAN bus illustrating one example configuration of a switchable resistor, according to some embodiments of the present disclosure.
Figure 7:
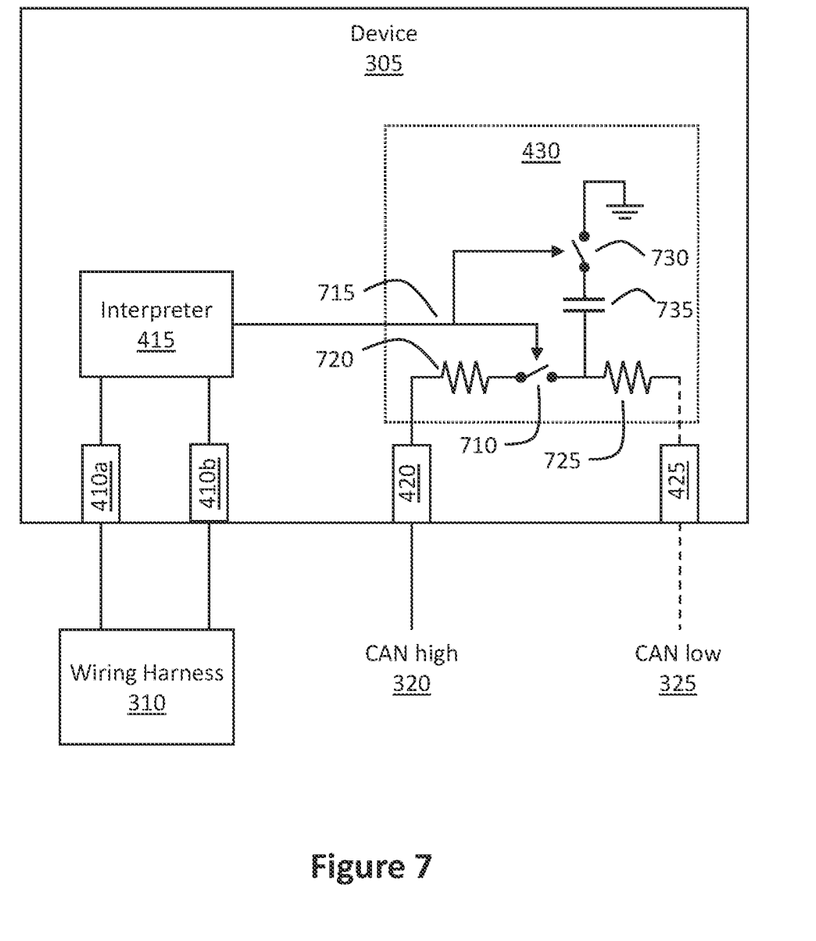
FIG. 7 is a block diagram of a device on a CAN bus illustrating another example configuration of a switchable resistor, according to some embodiments of the present disclosure.

The switchable resistor 430 includes at least one switch coupled to at least one termination resistor. The position of the switch is controlled by the interpreter to couple or uncouple the termination resistor(s) and the CAN bus 315, and in particular, to couple or uncouple the termination resistor(s) between the high voltage line 320 and the low voltage line 325. The high voltage line 320 and low voltage line 325 are coupled to the device 305 and, specifically, to the switchable resistor 430 via the pins 420 and 425; the pin 420 is coupled to the high voltage line 320, and the pin 425 is coupled to the low voltage line 325. FIGS. 5 and 7 illustrate two example implementations of the switchable resistor 430.

The interpreter 415 provides a signal to the switchable resistor 430 based on the identifier indicated by the ID pins 410. In particular, the interpreter 415 may provide a signal to set a switch position for one or more switches in the switchable resistor 430, e.g., instructing one or more switches to open or close. For example, the interpreter 415 is programmed to close a switch in the switchable resistor 430 if an identifier provided by the ID pins 410 corresponds to a specific value (e.g., 00, which correspond to end node 305a) or one of two specific values (e.g., 00 or 11, each of which corresponds to an end node 305a and 305n); otherwise, the switch is left open. In some embodiments, the interpreter 415 may be modified, e.g., by a firmware or software update, to adjust a rule for switching the switchable resistor 430. For example, if the devices 305 on the CAN bus 315 are reconfigured, or the wiring of the CAN bus 315 is changed, an operator may send a firmware update to the interpreter 415 to change which identifier(s) are associated with the end devices.

First Example Configuration of a Switchable Resistor

FIG. 5 is a block diagram of a device on a CAN bus illustrating one example configuration of a switchable resistor, according to some embodiments of the present disclosure. FIG. 5 includes the ID pins 410, interpreter 415, and wiring harness 310 of FIG. 4, as well as the pins 420 and 425 of FIG. 4, which are coupled to the high voltage line 320 and the low voltage line 325.

In this example, the switchable resistor 430 is illustrated as having a switch 510 that is connected in series with a resistor 520. The switch 510 may be, for example, an electrical switch (e.g., a transistor, such as a metal-semiconductor-oxide field-effect transistor (MOSFET), a mechanical switch, a magnetic switch, or another implementation. The position of the switch 510 is controlled by a control signal 515 from the interpreter 415. The control signal 515 may instruct the switch 510 to open or to close.

The resistor 520 may be a 120Ω resistor. In some embodiments, the resistor 520 may be implemented as a set of resistors (e.g., two or more resistors coupled in series and/or in parallel) with a combined resistance of 120Ω. When the switch 510 is closed, the resistor 520 is coupled to the CAN bus 315, and in particular, the resistor 520 is coupled between the high voltage line 320 and the low voltage line 325. In some embodiments, instead of the resistor 520, another device or circuitry for providing a 120Ω termination resistance are used, e.g., a wire or another ohmic device.

Figure 6:
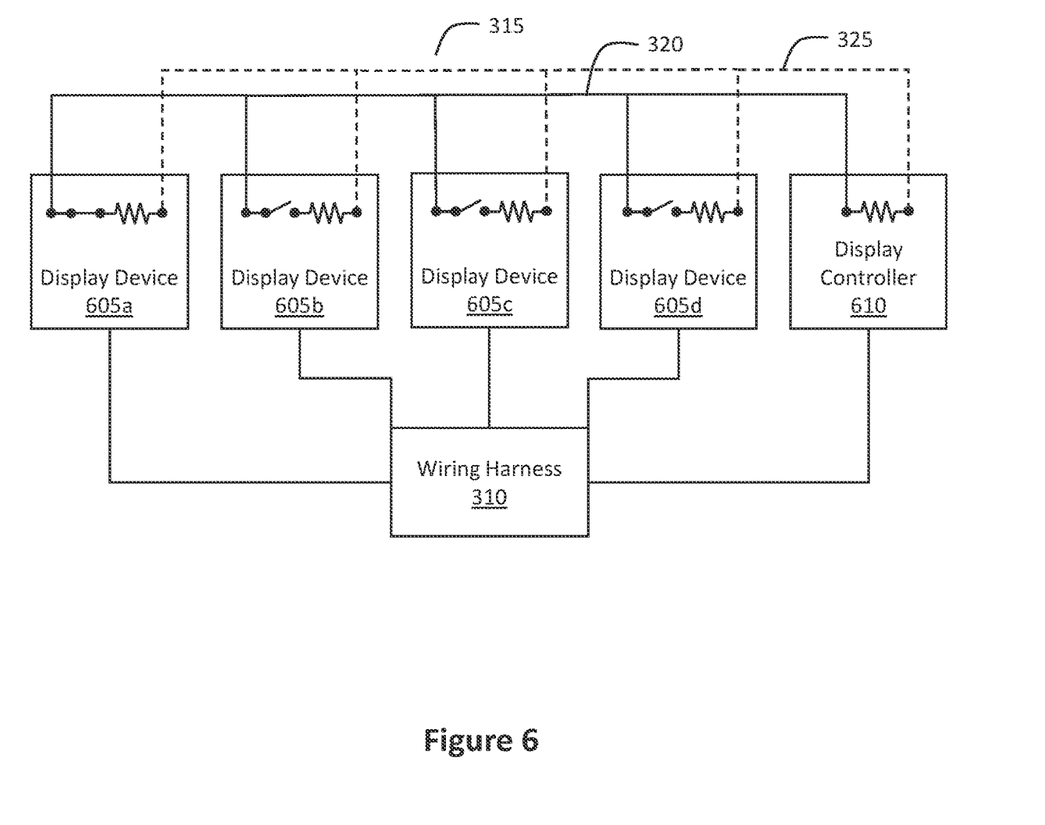
FIG. 6 is a block diagram illustrating a set of devices having the switchable resistor of FIG. 5, according to some embodiments of the present disclosure.

FIG. 6 is a block diagram illustrating a set of display devices having the switchable resistor of FIG. 5, according to some embodiments of the present disclosure. In this example, the CAN bus 315 is coupled to four display devices 605a-605d and a display controller 610. Each of the display devices 605a-605d is an example of the device 305. The interpreter 415 and pins 410 are omitted from the illustrations of the devices 605a-605d to simplify the drawings, but each device 605 includes the interpreter 415 and the pins 410. The display devices 605 and the display controller 610 are each coupled to the wiring harness 310. For example, the display devices 605 may each receive identifiers via the ID pins from the wiring harness 310 or another signal source, as described with respect to FIG. 4.

The display device 605a is one end node of the CAN bus 315, and the display controller 610 is the other end node of the CAN bus 315. The display controller 610 includes a termination resistor, which in this example, is not switchable. In other examples, the display controller 610 may include a switchable resistor, e.g., the switchable resistor shown in FIG. 5. Each of the display devices 605a-605d includes a switchable resistor. The display devices 605a-605d may have identical hardware, including the switchable resistors. In this configuration, the switch of the display device 605a is closed, so that the termination resistor in the display device 605a is coupled to the CAN bus 315. The switches in the switchable resistors of the display devices 605b-605d are open, so that these resistors are not coupled to the CAN bus 315.

Second Example Configuration of a Switchable Resistor

FIG. 7 is a block diagram of a device on a CAN bus illustrating another example configuration of a switchable resistor, according to some embodiments of the present disclosure. FIG. 7 includes the ID pins 410, interpreter 415, and wiring harness 310 of FIG. 4, as well as the pins 420 and 425 of FIG. 4, which are coupled to the high voltage line 320 and the low voltage line 325.

In this example, the switchable resistor 430 is illustrated as having a switch 710 that is connected in series with two resistors 720 and 725. The switch 710 may be any of the switches 510 described with respect to FIG. 5. The position of the switch 710 is controlled by a control signal 715 from the interpreter 415. The control signal 715 may instruct the switch 710 to open or to close.

The total resistance of the resistors 720 and 725 is 120Ω or approximately 120Ω. For example, the resistor 720 may have a resistance of 90Ω and the resistor 725 may have a resistance of 30Ω, or each of the resistors 720 and 725 may have a resistance of 60Ω. When the switch 710 is closed, the resistors 720 and 725 are coupled to the CAN bus 315, and in particular, between the high voltage line 320 and the low voltage line 325.

In this example, the switchable resistor 430 further includes a capacitor 735 coupled in parallel with the resistor 725 to improve the signal integrity and robustness of the CAN bu. One end of the capacitor 735 is coupled between the resistor 725 and the switch 710. The opposite end of the capacitor 735 is coupled to a second switch 730, which is between the capacitor 735 and a ground. Alternatively, the second switch 730 may be moved to opposite side of the capacitor 735, so that the second switch 730 is coupled between the capacitor 735 and the resistor 725. The same control signal 715 controls a position of the switch 730, which, in this example, applies the ground to one side of the capacitor 735 when the resistors 720 and 725 are coupled to the CAN bus 315. When the resistors 720 and 725 are not coupled to the CAN bus 315, the capacitor 735 is left floating.

A CAN termination with split resistors and a capacitor, as illustrated in FIG. 7, is referred to as a split bus termination. The addition of the capacitor 735 allows the termination to act as a low-pass filter, which shunts high-frequency signals to the ground to improve noise immunity and reduce emissions. The switches 710 and 730 are added to the split bus termination design so that the termination can be coupled to the CAN bus if the device is an end node, and not coupled to the CAN bus if the device is not an end node.

Example Process for Configuring Devices on a CAN Bus

Figure 8:
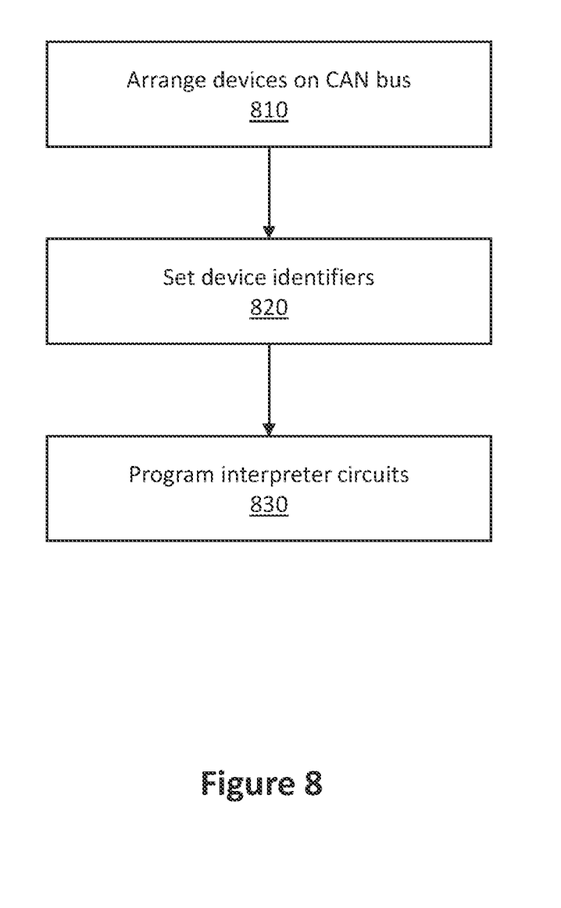
FIG. 8 is a flowchart of a process for configuring devices along a CAN bus, according to some embodiments of the present disclosure.

FIG. 8 is a flowchart of a process for configuring devices along a CAN bus, according to some embodiments of the present disclosure. At 810, devices are arranged on a CAN bus. For example, the devices 305 are coupled to the CAN bus 315, as described with respect to FIG. 3. Two devices on the CAN bus are at the ends of the CAN bus; these are the end nodes. At least a portion of the devices on the CAN bus include switchable resistors, e.g., the switchable resistors illustrated in FIG. 5 or 7.

At 820, device identifiers are set for at least a portion of the devices on the CAN network, e.g., for a set of devices of the same type. To set the device identifiers, wires coupling the ID pins 410 of two or more devices may be plugged into the appropriate voltage levels at the wiring harness 310. Each device may be assigned a unique device identifier, as described with respect to FIG. 4.

At 830, in each of the devices with switchable resistors, the interpreter circuit is programmed to set the switch position of the switchable resistor. For example, the interpreter circuit is programmed to close a switch (or leave the switch closed, if that is a prior or default position) if the device identifier is an identifier for an end node; otherwise, the interpreter circuit is programmed to open a switch (or leave the switch opened, if that is a prior or default position). The programming of the interpreter circuits in each of the devices with switchable resistors may be the same. For example, each of the interpreter circuits may be programmed to send a control signal to close the switch of the switchable resistor if the device identifier is 00, and to send a control signal to open the switch of the switchable resistor if the device identifier is not 00.

In different embodiments, the processes 810, 820, and 830 may be performed in different orders. For example, the interpreter circuits may be programmed before the devices are installed in a vehicle and coupled to the CAN bus.

SELECT EXAMPLES

Example 1 provides a vehicle that includes a first device coupled to a CAN bus, the first device having a first device identifier, the first device including a first resistor, a first switch coupled to the first resistor, and a first interpreter circuit to set the first switch in a first switch position based on the first device identifier, where, in the first switch position, the first resistor is coupled to the CAN bus; and a second device coupled to the CAN bus, the second device having a second device identifier different from the first device identifier, the second device including a second resistor, a second switch coupled to the second resistor, and a second interpreter circuit to set the second switch in a second switch position based on the second device identifier, where, in the second switch position, the second resistor is not coupled to the CAN bus.

Example 2 provides the vehicle of example 1, where the first device is at a first end of the CAN bus, and a third device is at a second end of the CAN bus.

Example 3 provides the vehicle of example 2, where the second device is between the first device and the third device on the CAN bus.

Example 4 provides the vehicle of any of the preceding examples, where the first device and the second device are a same type of device.

Example 5 provides the vehicle of example 4, where the first device and the second device are each external display devices for the vehicle.

Example 6 provides the vehicle of any of the preceding examples, where the first interpreter circuit is coupled to a plurality of identification pins of the first device, where voltage levels applied to the identification pins correspond to the first device identifier.

Example 7 provides the vehicle of example 6, where the first interpreter circuit is programmed to generate a control signal for the first switch based on the voltage levels applied to the identification pins.

Example 8 provides the vehicle of any of the preceding examples, where the CAN bus includes a high voltage line and a low voltage line, and the first switch in the first switch position couples the first resistor between the high voltage line and the low voltage line.

Example 9 provides a device that includes a first set of pins to couple the device to a CAN bus; a second set of pins to receive device identifier signals; a resistor; a switch coupled to the resistor; and an interpreter circuit coupled to the second set of pins, the interpreter circuit to set the switch in a first switch position or a second switch position based on the device identifier signals, where, in the first switch position, the resistor is coupled to the CAN bus via the first set of pins.

Example 10 provides the device of example 9, where the device identifier signals further indicate a device identifier of the device on the CAN bus, where each device on the CAN bus is associated with a unique device identifier.

Example 11 provides the device of example 9 or 10, where the resistor and the switch are connected in series.

Example 12 provides the device of any of examples 9-11, where the resistor is a first resistor, the device further including a second resistor, where the switch is between the first resistor and the second resistor.

Example 13 provides the device of example 12, where the switch is a first switch, the device further including a capacitor, a first end of the capacitor coupled to the second resistor via the first switch; and a second switch coupled to the capacitor.

Example 14 provides the device of example 13, where the interpreter circuit controls a switch position of the second switch, the first switch and the second switch having a same switch position.

Example 15 provides the device of any of examples 9-14, where the CAN bus includes a high voltage line and a low voltage line, a first pin of the first set of pins coupled to the high voltage line and a second pin of the first set of pins coupled to the low voltage line, and the switch in the first switch position couples the resistor between the high voltage line and the low voltage line.

Example 16 provides the device of any of examples 9-14, where in the second switch position, the resistor is not coupled to the CAN bus.

Example 17 provides the device of any of examples 9-14, where the interpreter circuit includes firmware indicating at least one device identifier corresponding to the first switch position.

Example 18 provides a method that includes setting device identifiers for a plurality of devices, each of the plurality of devices coupled to a CAN bus, each of the plurality of devices including a switch coupled to a resistor; for each of the plurality of devices, programming an interpreter circuit to set the switch in one of a first switch position and a second switch position based on the device identifier, where, in the first switch position, the resistor is coupled to the CAN bus, and in the second switch position, the resistor is not coupled to the CAN bus.

Example 19 provides the method of example 18, further including arranging the plurality of devices on the CAN bus, where a first device of the plurality of devices is at a first end of the CAN bus and has a first device identifier, and the interpreter circuit is to set the switch of the first device to the first switch position to couple the resistor of the first device to the CAN bus.

Example 20 provides the method of example 18 or 19, where the plurality of devices are a same type of device, and each of the interpreter circuits of the plurality of devices are identically programmed.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A vehicle comprising:
    a first device coupled to a control area network (CAN) bus, the first device having
        a first device identifier, the first device comprising:
        a first resistor;
        a first switch coupled to the first resistor;
        a first identifier pin configured to receive a first binary signal; and
        a first interpreter circuit coupled to the first identifier pin, the first interpreter circuit configured to set the first switch in a first switch position when the first binary signal is equal to the first device identifier, wherein, in the first switch position, the first resistor is coupled to the CAN bus; and a second device coupled to the CAN bus, the second device having a second device identifier different from the first device identifier, the second device comprising:
  a second resistor;
  a second switch coupled to the second resistor;
  a second identifier pin configured to receive a second binary signal; and
  a second interpreter circuit coupled to the second identifier pin, the second interpreter circuit configured to set the second switch in a second switch position when the second binary signal is equal to the second device identifier, wherein, in the second switch position, the second resistor is not coupled to the CAN bus.

2. The vehicle of claim 1, wherein the first device is at a first end of the CAN bus, and a third device is at a second end of the CAN bus.

3. The vehicle of claim 2, wherein the second device is between the first device and the third device on the CAN bus.

4. The vehicle of claim 1, wherein the first device and the second device are a same type of device.

5. The vehicle of claim 4, wherein the first device and the second device are mounted on an exterior of the vehicle.

6. The vehicle of claim 1, wherein the first interpreter circuit is coupled to a plurality of identification pins of the first device, wherein voltage levels applied to the plurality of identification pins correspond to the first device identifier.

7. The vehicle of claim 6, wherein the first interpreter circuit is programmed to generate a control signal for the first switch based on the voltage levels applied to the plurality of identification pins.

8. The vehicle of claim 1, wherein the CAN bus comprises a high voltage line and a low voltage line, and the first switch in the first switch position couples the first resistor between the high voltage line and the low voltage line.

9. The vehicle of claim 1, wherein the first identifier pin of the first device and the second identifier pin of the second device are each connected to a wiring harness and the wiring harness provides the first binary signal to the first identifier pin and the second binary signal to the second identifier pin.

* * * * *